United States Patent
Hsu et al.

(10) Patent No.: US 8,522,041 B2
(45) Date of Patent: Aug. 27, 2013

(54) SYSTEM AND METHOD FOR EFFICIENTLY PERFORMING A DATA ENCRYPTION OPERATION

(75) Inventors: Sherry Chu-Hsin Hsu, Los Altos Hills, CA (US); Praveen K. Kolli, Sunnyvale, CA (US); Delmar Marr, San Jose, CA (US); Chao-Yuan Chang, Cupertino, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 4117 days.

(21) Appl. No.: 09/896,255

(22) Filed: Jun. 28, 2001

(65) Prior Publication Data

US 2002/0073324 A1    Jun. 13, 2002

Related U.S. Application Data

(60) Provisional application No. 60/254,159, filed on Dec. 7, 2000.

(51) Int. Cl.
*H04L 9/00* (2006.01)

(52) U.S. Cl.
USPC .......................................................... 713/189

(58) Field of Classification Search
USPC ............... 713/189, 192, 167, 200; 726/9, 726/20
See application file for complete search history.

(56) References Cited

U.S. PATENT DOCUMENTS 6,708,273 B1 *   3/2004   Ober et al. .................... 713/189
6,820,203 B1 *  11/2004   Okaue et al. .................. 713/193

* cited by examiner

*Primary Examiner* — Ellen Tran
(74) *Attorney, Agent, or Firm* — Sony Corporation of America

(57) ABSTRACT

A system and method for efficiently performing a data encryption operation in an electronic system preferably includes a processor that may initially create an encryption structure in a memory device. The encryption structure may preferably include one or more command structures for performing data encryption or decryption operations. The processor may subsequently program local control registers of a DMA engine with selected encryption information in response to a data encryption or decryption requirement. The processor may then instruct the DMA engine to perform the required data encryption or decryption operation. Next, the DMA engine may responsively copy one or more of the command structures from the memory device into local command registers that are coupled to the DMA engine. The DMA engine may then reference the foregoing control registers and command registers to thereby efficiently perform one or more data encryption or decryption operations. During the data encryption or decryption operations, the DMA engine may preferably provide source data from the memory device to an encryption module for encrypting or decrypting. The DMA engine may then responsively store the encrypted or decrypted data back into the memory device as destination data that may be subsequently provided to any appropriate destination entity that is coupled to the electronic system.

42 Claims, 10 Drawing Sheets

Command Structure

```
typedef struct DMA_Cmd
{
    unsigned controlStatus;         538
    unsigned int sourceAddr;        // Starting source address       512
    unsigned int destAddr;          // Starting destination address  516
    unsigned int byteCount;         // Number of bytes to transfer   522
    DMA_Cmd *nextDMACmd;            // Ptr to next command struct    526
} DMA_Command;
```

SYSTEM AND METHOD FOR EFFICIENTLY PERFORMING A DATA ENCRYPTION OPERATION

CROSS-REFERENCE TO RELATED APPLICATIONS

This application relates to, and claims priority in, U.S. Provisional Patent Application Ser. No. 60/254,159, entitled "Flexible DES Across The Whole Memory System" filed on Dec. 7, 2000. The related application is commonly assigned, and is hereby incorporated by reference.

BACKGROUND SECTION

1. Field of the Invention

This invention relates generally to techniques for managing data, and relates more particularly to a system and method for efficiently performing a data encryption operation.

2. Description of the Background Art

Implementing efficient methods for managing data is a significant consideration for designers and manufacturers of contemporary electronic devices. However, efficiently managing data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that manages digital image data may benefit from an effective implementation because of the large amount and complexity of the digital data involved.

In certain contemporary environments, providing adequate system security to ensure confidentiality of selected data may be a concern. For example, a particular electronic system may advantageously implement various encryption schemes to thereby provide sufficient protection for sensitive data.

Due to growing demands on system resources and substantially increasing data magnitudes, it is apparent that developing new techniques for managing data is a matter of concern for related electronic technologies. Therefore, for all the foregoing reasons, developing efficient systems for managing data remains a significant consideration for designers, manufacturers, and users of contemporary electronic devices.

SUMMARY

In accordance with the present invention, a system and method are disclosed for efficiently performing a data encryption operation in an electronic system. The principles of the present invention are primarily discussed in the context of data encryption operations. However, various data decryption operations may also be readily performed using the same or similar techniques.

In one embodiment, initially, a central processing unit (CPU) may preferably monitor the electronic system until performance of a data encryption operation is required by any appropriate entity. When a data encryption operation is required in the electronic system, then the CPU may preferably create an encryption structure that includes one or more command structures. The CPU may preferably store the resultant encryption structure into a memory device that is coupled to the electronic system. The CPU may also selectively program one or more local control registers of a DMA engine to provide relevant information regarding the required data encryption operation for local access by the DMA engine of the electronic system.

Next, the CPU may preferably instruct the DMA engine to assume control and perform the required data encryption operation. In certain embodiments, the CPU may set a start bit in a start register of the local control registers to thereby instruct the DMA engine to perform the required data encryption operation. The CPU may then advantageously begin to perform other processing tasks for the electronic system.

In response, a state machine of the DMA engine may preferably copy a designated command structure from the memory device into local command registers that are coupled to the DMA engine. The DMA engine may then preferably reference data encryption information in the foregoing control registers and command registers to efficiently control the required data encryption operation. During the data encryption operations, the DMA engine may preferably provide source data from the memory device to an encryption module for encrypting or decrypting. The DMA engine may then responsively store the encrypted or decrypted data back into the memory device as destination data that may be subsequently provided to any appropriate destination entity that is coupled to the electronic system.

The DMA engine may preferably also monitor the data encryption operation to determine whether a completion condition has occurred. If the DMA engine determines that a completion condition has occurred with regard to the current data encryption operation, then the DMA engine may preferably notify the CPU that a completion condition has occurred, and the DMA engine may then terminate the current data encryption operation. The present invention thus provides an improved system and method for efficiently performing a data encryption operation.

BRIEF DESCRIPTION OF THE DRAWINGS

FIG. 5 is a block diagram for one embodiment of a command structure from FIG. 4, in accordance with the present invention;

DETAILED DESCRIPTION

The present invention relates to an improvement in data management techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for efficiently performing a data encryption operation in an electronic system, and preferably includes a processor that may initially create an encryption structure in a memory device. The encryption structure may preferably include one or more command structures for performing data encryption or decryption operations. The processor may subsequently program local control registers of a DMA engine with selected encryption information in response to a data encryption or decryption requirement. The processor may then instruct the DMA engine to perform the required data encryption or decryption operation.

Next, the DMA engine may responsively copy one or more of the command structures from the memory device into local command registers that are coupled to the DMA engine. The DMA engine may then reference the foregoing control registers and command registers to thereby efficiently control one or more data encryption or decryption operations. During the data encryption or decryption operations, the DMA engine may preferably provide source data from the memory device to an encryption module for encrypting or decrypting. The DMA engine may then responsively store the encrypted or decrypted data back into the memory device as destination data that may be subsequently provided to any appropriate destination entity that is coupled to the electronic system.

Figure 1:
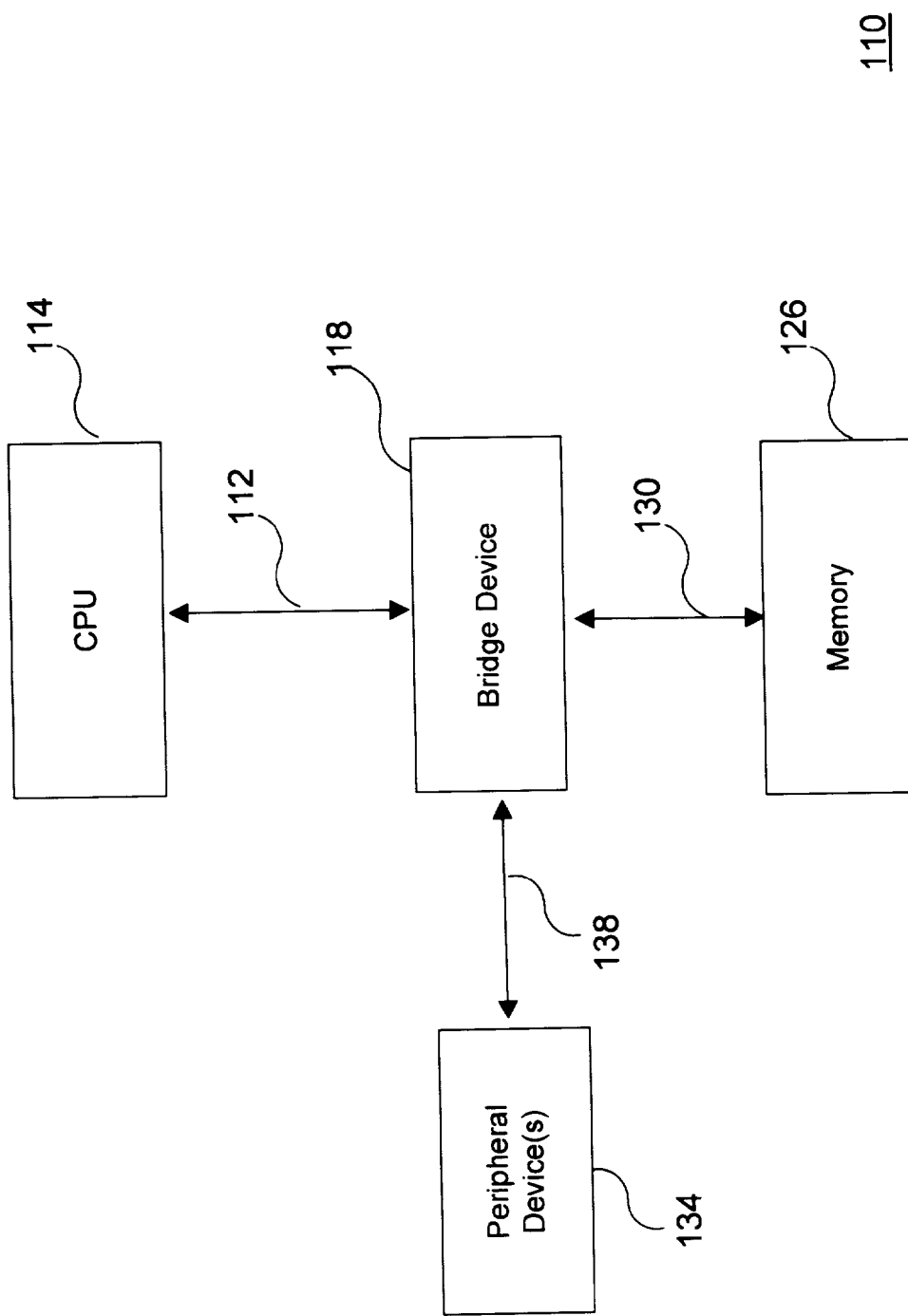
FIG. 1 is a block diagram for one embodiment of an electronic system, in accordance with the present invention.

Referring now to FIG. 1, a block diagram for one embodiment of an electronic system 110 is shown, in accordance with the present invention. In the FIG. 1 embodiment, electronic system 110 may preferably include, but is not limited to, a central processing unit (CPU) 114, a bridge device 118, a memory 126, and one or more peripheral devices 134. In alternate embodiments, electronic system 110 may readily include various other elements or functionalities in addition to, or instead of, those elements or functionalities discussed in conjunction with the FIG. 1 embodiment. Furthermore, electronic system 110 may be implemented and configured in any desired manner. For example, electronic system 110 may be implemented as one or more integrated circuit devices, as a audio/visual electronic device, as a consumer electronics device, as a portable electronic device, or as a computer device.

In the FIG. 1 embodiment, CPU 114 may preferably be implemented as any appropriate and effective processor device or microprocessor to thereby control and coordinate the operation of electronic system 110 in response to various software program instructions. Bridge device 118 may communicate with CPU 114 via path 112, and may preferably include one or more interfaces for bidirectionally communicating with other devices or entities in electronic system 110. One embodiment of bridge device 118 is further discussed below in conjunction with FIG. 2.

In the FIG. 1 embodiment, memory 126 may bidirectionally communicate with bridge device 118 via path 130. Memory 126 may be implemented by utilizing any desired technologies or configurations. For example, in certain embodiments, memory 126 may preferably be implemented as a memory device that is optimized for performing block transfers of various data. One implementation and configuration for memory 126 is further discussed below in conjunction with FIG. 3.

In accordance with the present invention, bridge device 118 may also bidirectionally communicate with various peripheral devices in electronic system 110. In the FIG. 1 embodiment, bridge device 118 may preferably communicate with one or more peripheral device 134 via path 138. In alternate embodiments, bridge device 118 may readily communicate with any desired number of peripheral devices 134 in addition to, or instead of, those peripheral devices 134 that are presented and discussed in conjunction with the FIG. 1 embodiment.

Figure 2:
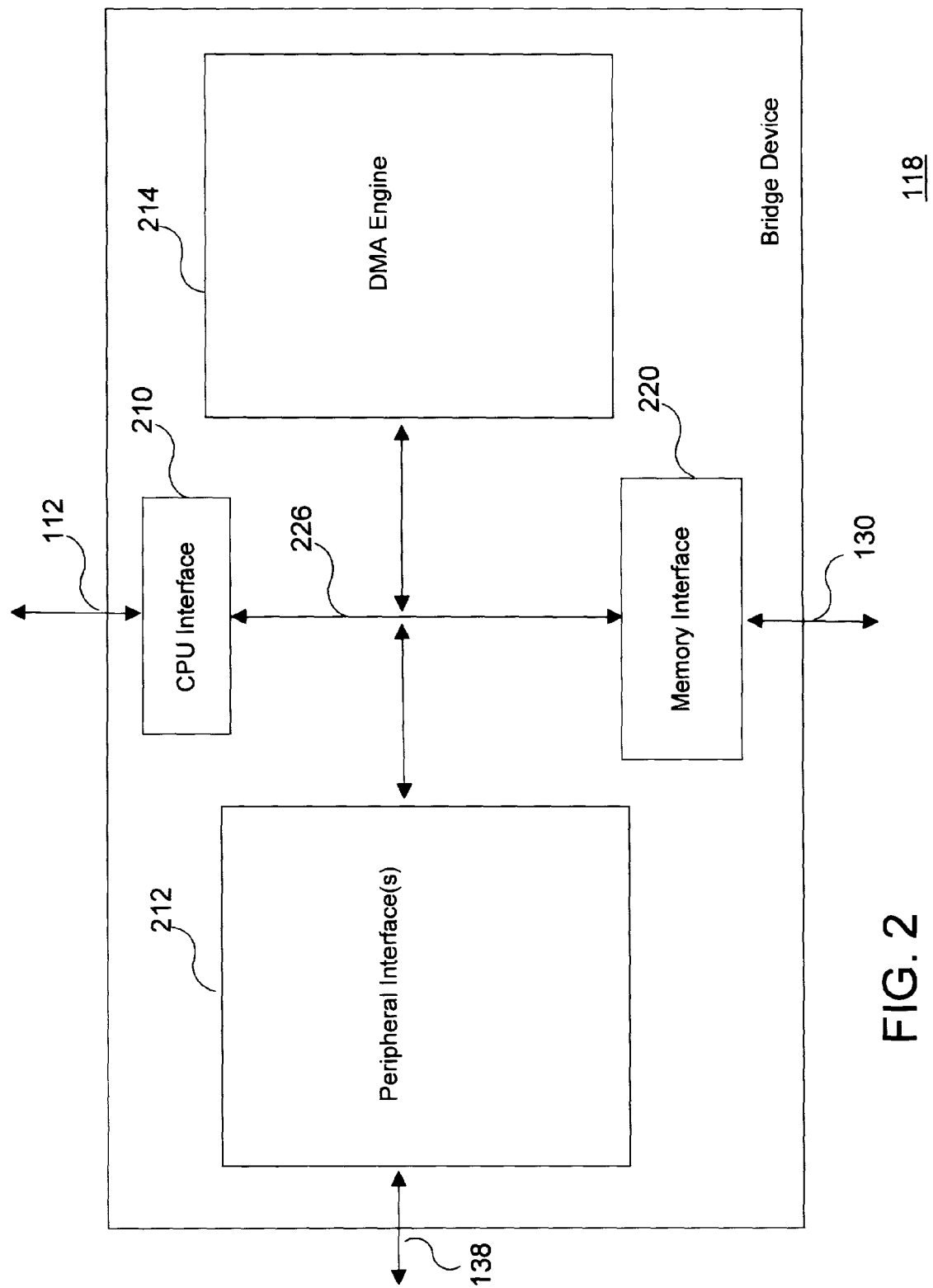
FIG. 2 is a block diagram for one embodiment of the bridge device of FIG. 1, in accordance with the present invention.

Referring now to FIG. 2, a block diagram for one embodiment of the FIG. 1 bridge device 118 is shown, in accordance with the present invention. In the FIG. 2 embodiment, bridge device 118 may preferably include, but is not limited to, a CPU interface 210, one or more peripheral interfaces 212, a DMA engine 214, and a memory interface 220. In alternate embodiments, bridge device 118 may readily include various other elements or functionalities in addition to, or instead of, those elements or functionalities discussed in conjunction with the FIG. 2 embodiment. In addition, bridge device 118 may be implemented in any appropriate manner. For example, in certain embodiments, bridge device 118 may be implemented as a separate integrated circuit device in electronic system 110.

In the FIG. 2 embodiment, CPU 114 may communicate with bridge device 118 through a CPU interface 210. Similarly, memory 126 may communicate with bridge device 118 through a memory interface 220. In addition, peripheral devices 134 may communicate with bridge device 118 through respective peripheral interfaces 212. Bridge device 118 may preferably also include a bridge bus 226 to enable various components and devices in electronic system 110 to effectively communicate through bridge device 118. The configuration and functionality of bridge device 118 is further discussed below in conjunction with FIGS. 3 through 10.

Figure 3:
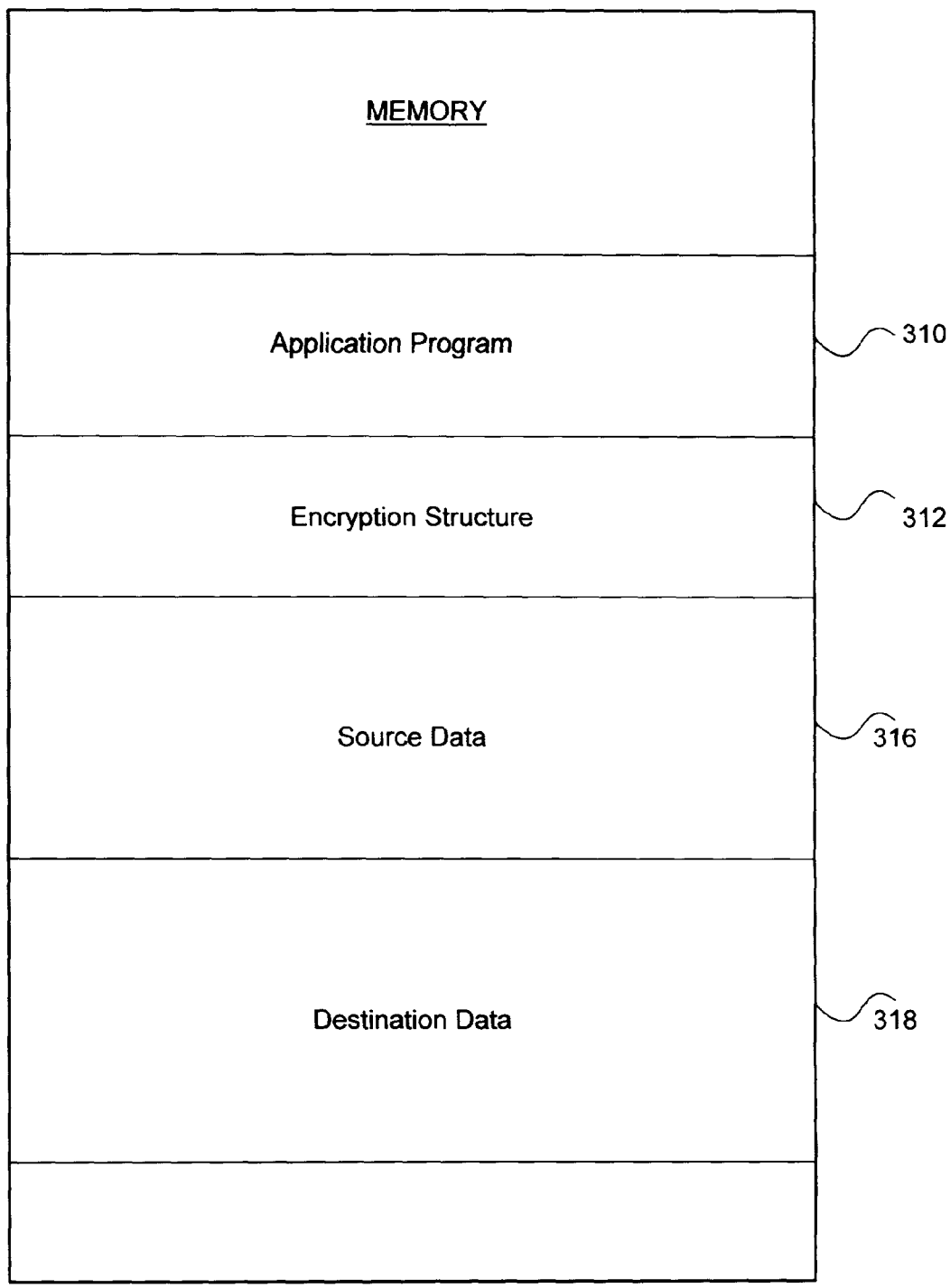
FIG. 3 is a block diagram for one embodiment of the memory of FIG. 1, in accordance with the present invention.

Referring now to FIG. 3, a block diagram for one embodiment of the FIG. 1 memory 126 is shown, in accordance with the present invention. In the FIG. 3 embodiment, memory 126 may preferably include, but is not limited to, an application program 310, an encryption structure 312, source data 316, and destination data 318. In alternate embodiments, memory 126 may readily include various other elements or functionalities in addition to, or instead of, those elements or functionalities discussed in conjunction with the FIG. 3 embodiment. In certain embodiments, memory 126 may be implemented as a synchronous dynamic random access memory (SDRAM) or other similar block-transfer memory device.

In the FIG. 3 embodiment, application program 310 may include software instructions that are preferably executed by CPU 114 (FIG. 1) to perform various functions and operations for electronic system 110. The particular nature and functionality of application program 310 preferably varies depending upon factors such as the specific type and particular use of the corresponding electronic system 110.

In the FIG. 3 embodiment, encryption structure 312 may preferably include various types of appropriate information for performing one or more data encryption or data decryption operations in electronic system 110. For reasons of simplicity, where appropriate during the course of this document, the term "encryption" may encompass either a data encryption process or a data decryption process. One embodiment for encryption structure 312 is further discussed below in conjunction with FIG. 4. In the FIG. 3 embodiment, source data 316 may preferably include any desired type of information from any appropriate source entity that is coupled to electronic system 110. Similarly, destination data 318 may preferably include any desired type of information for transmission to any appropriate destination entity that is coupled to electronic system 110. The utilization of source data 316 and destination data 318 is further discussed below in conjunction with FIG. 9.

Figure 4:
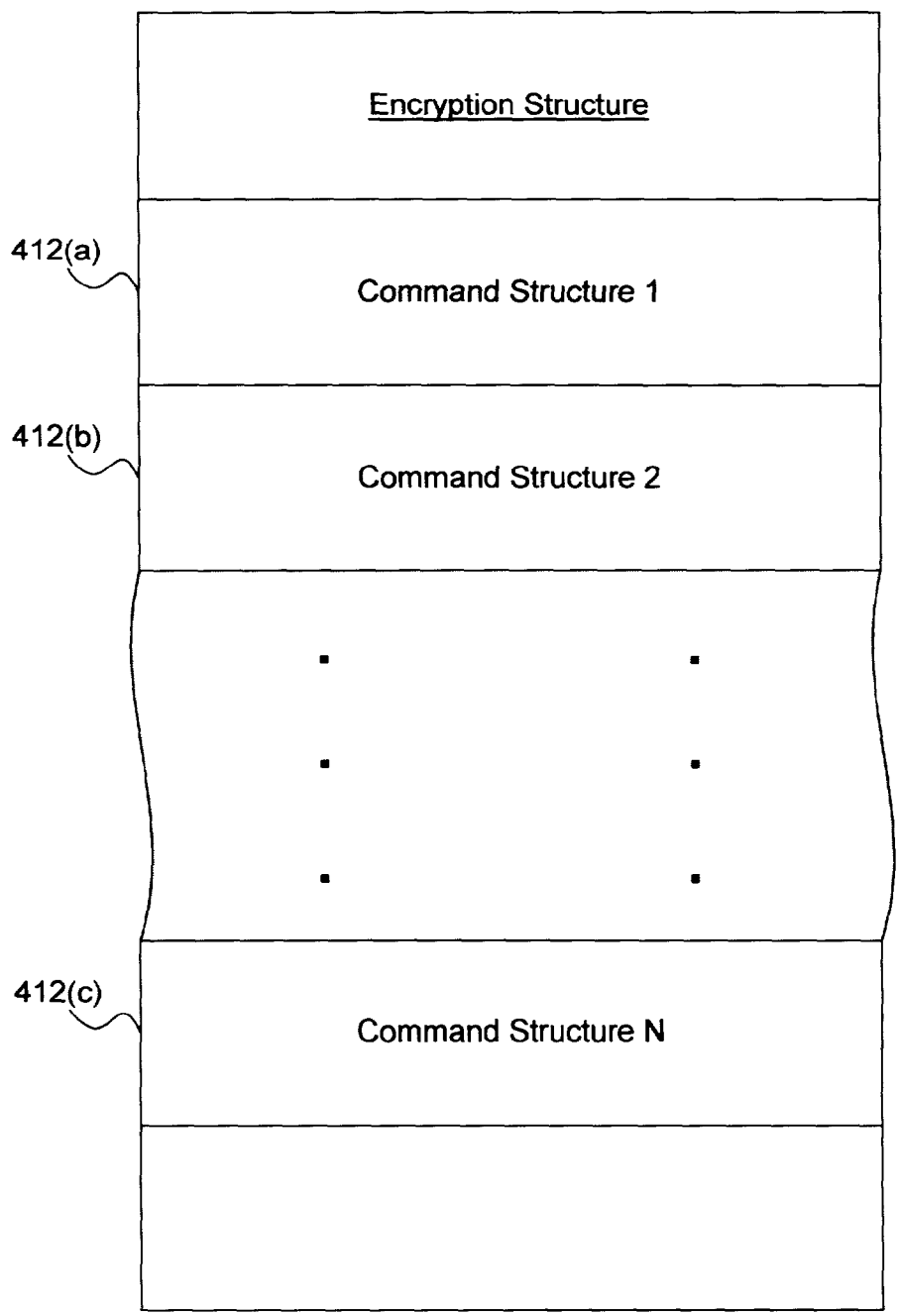
FIG. 4 is a block diagram for one embodiment of the encryption structure of FIG. 3, in accordance with the present invention.

Referring now to FIG. 4, a block diagram for one embodiment of the FIG. 3 encryption structure 312 is shown, in accordance with the present invention. In the FIG. 5 embodiment, encryption structure 312 may preferably include, but is not limited to, a command structure 1 (412(a)) through a command structure N (412(c)). In alternate embodiments, encryption structure 312 may readily include various other elements or functionalities in addition to, or instead of, those elements or functionalities discussed in conjunction with the FIG. 4 embodiment. Furthermore, in various embodiments, command structures 412 of encryption structure 312 may be stored in memory 126 in either a contiguous or a non-contiguous manner.

In the FIG. 4 embodiment, encryption structure 312 may preferably include, but is not limited to, a command structure 1 (412(a)) through a command structure N (412(c)) that may, in certain instances form a linked list. In an alternate embodiment, encryption structure 312 may be implemented with only a single command structure 412. In accordance with the present invention, the command structures 412 of encryption structure 312 may therefore advantageously be linked together in manner that allows them to be utilized consecutively without intervention by CPU 114. One embodiment for the configuration and implementation of command structures 412 is further discussed below in conjunction with FIG. 5.

Referring now to FIG. 5, a block diagram for one embodiment of a command structure 412 from FIG. 4 is shown, in accordance with the present invention. In the FIG. 5 embodiment, the configuration of command structure 412 is presented using the C programming language to define one exemplary command structure 412 for data encryption operations in electronic system 110.

In the FIG. 5 embodiment, command structure 412 may preferable include, but is not limited to, a starting source address 512 that corresponds to source data 316 of a data encryption operation, and starting destination address 516 that corresponds to destination data 318 of a data encryption operation. Command structure 412 may also include a transfer bytes total (number of bytes to transfer) 522 that indicates the total size of the data corresponding a data encryption operation. DMA engine 216 or other appropriate entity may thus determine when a particular data encryption operation is complete by calculating and comparing a current total encrypted data value to the foregoing transfer bytes total 522. Command structure 412 may also preferably include a pointer to next command structure 526 to thereby link any desired command structures 412 in encryption structure 312 into a particular sequence.

In addition, command structure 412 may preferably include a control status command (unsigned controlStatus) 538. The implementation and functionality of control status command 538 is further discussed below in conjunction with FIG. 6. In alternate embodiments, command structures 412 may readily include various other elements or functionalities in addition to, or instead of, those elements or functionalities discussed in conjunction with the FIG. 5 embodiment.

Figure 6:
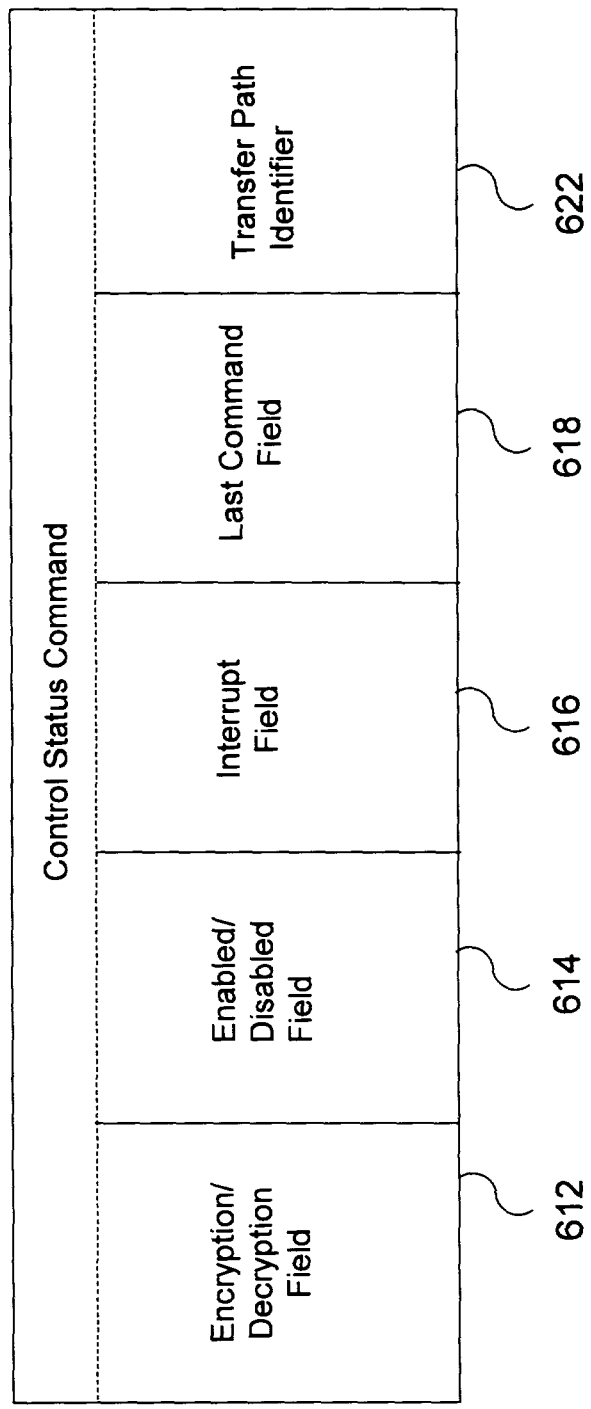
FIG. 6 is a block diagram for one embodiment of a control status command from FIG. 5, in accordance with the present invention.

Referring now to FIG. 6, a block diagram for one embodiment of the FIG. 5 control status command 538 is shown, in accordance with the present invention. In the FIG. 6 embodiment, control status command 538 may preferably include, but is not limited to, an encryption/decryption field 612, an enabled/disabled field 614, an interrupt field 616, a last command field 618, and a transfer path identifier 622.

In the FIG. 6 embodiment, encryption/decryption field 612 may preferably indicate whether a particular command structure 412 contains instructions for DMA engine 214 to perform either an encryption operation or a decryption operation. Enabled/disabled field 614 may preferably indicate to DMA engine 214 whether a corresponding data encryption (or decryption) operation is currently enabled or disabled for execution.

In addition, control status command 538 may preferably include an interrupt field 616 to designate whether an interrupt should occur following the current data encryption procedure, a last command field 618 to indicate a final command structure 412 in a linked list, and a transfer path identifier 622 which may preferably indicate the original source of source data 316 and the final destination of destination data 318. In alternate embodiments, control status command 538 may readily include various other elements or functionalities in addition to, or instead of, those elements or functionalities discussed in conjunction with the FIG. 6 embodiment.

Figure 7:
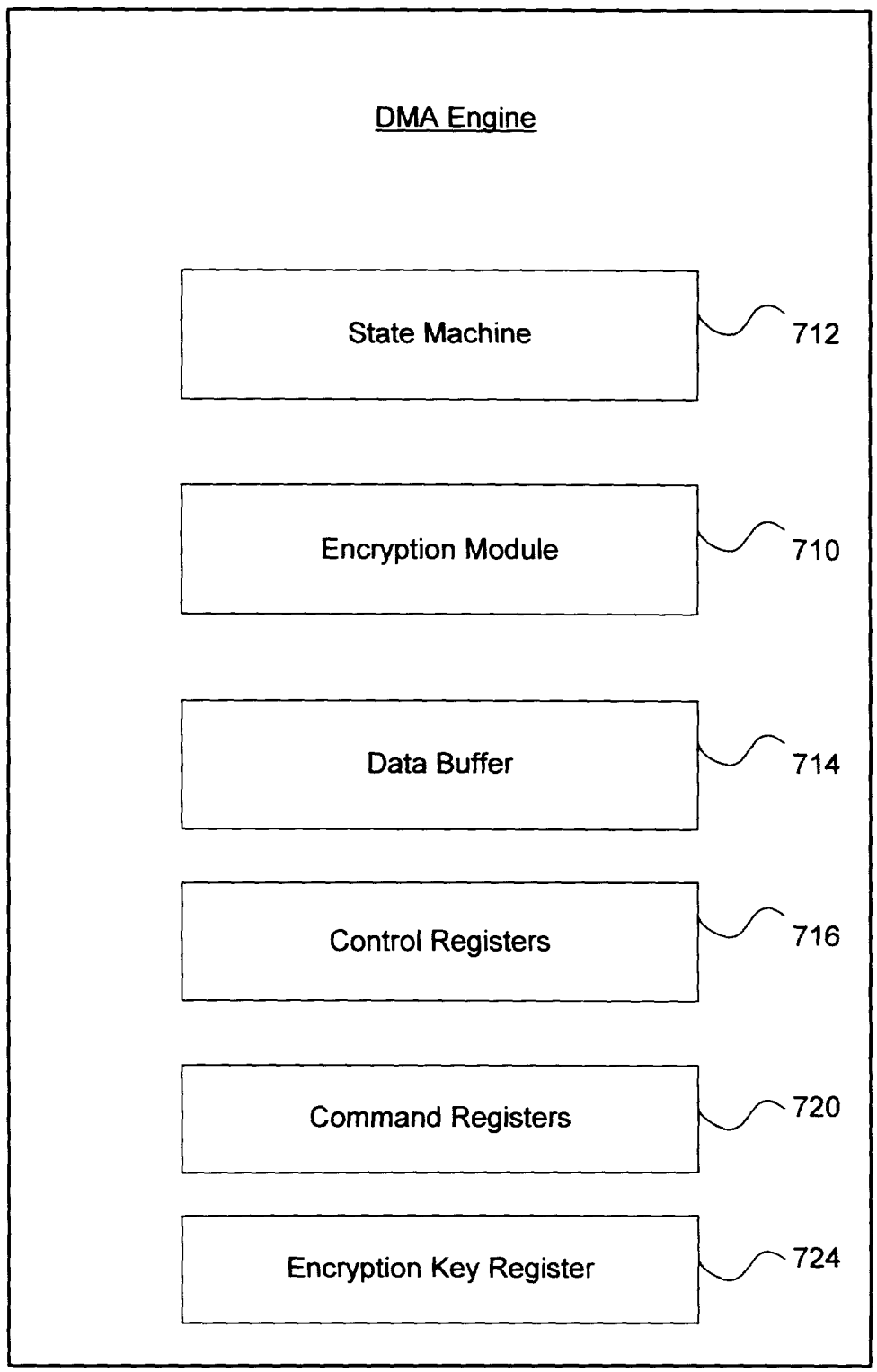
FIG. 7 is a block diagram of the DMA engine of FIG. 2, in accordance with one embodiment of the present invention.

Referring now to FIG. 7, a block diagram of the FIG. 2 DMA engine 216 is shown, in accordance with one embodiment of the present invention. In the FIG. 7 embodiment, DMA engine 216 may be implemented as a transfer engine that preferably includes, but is not limited to, an encryption module 710, a state machine 712, a data buffer 714, one or more control registers 716, one or more command registers 720, and an encryption key register 724. In alternate embodiments, DMA engine 216 may readily include various other elements or functionalities in addition to, or instead of, those elements or functionalities discussed in conjunction with the FIG. 7 embodiment.

In the FIG. 7 embodiment, encryption module 710 may preferably be configured to perform one or more data encryption or data decryption operations. Encryption module 710 may preferably perform various encryption/decryption operations in any effective manner by utilizing any appropriate techniques. In certain embodiments, encryption module 710 may preferably utilize an Electronic Codebook Mode (ECM) of a Data Encryption Standard (DES) that is further discussed in greater detail in "America National Standard Data Encryption Algorithm", ANSI X3.92-1981, American National Standards Institute, Inc., 1981, which is hereby incorporated by reference.

In the FIG. 7 embodiment, state machine 712 may include any appropriate and effective means for controlling the operation of DMA engine 216 to thereby perform various data encryption operations. In certain embodiments, state machine 712 of DMA engine 214 may also perform various DMA data transfer operations. Data buffer 714 may temporarily store data and other information to be utilized in conjunction with various data encryption operations.

Control registers 716 may preferably include selected information that DMA engine 214 may repeatedly require for performing various data encryption/decryption operations.

One embodiment for control registers 716 is discussed below in conjunction with FIG. 8. Command registers 720 may preferably include information from one or more command structures 412 that may be copied into command registers 720 for local access by DMA engine 216 to perform corresponding data encryption operations. Encryption key register 724 may preferably store one or more encryption keys for use by encryption module 710 during encryption/decryption operations. The functionality and utilization of DMA engine 216 is further discussed below in conjunction with FIGS. 9 and 10.

Figure 8:
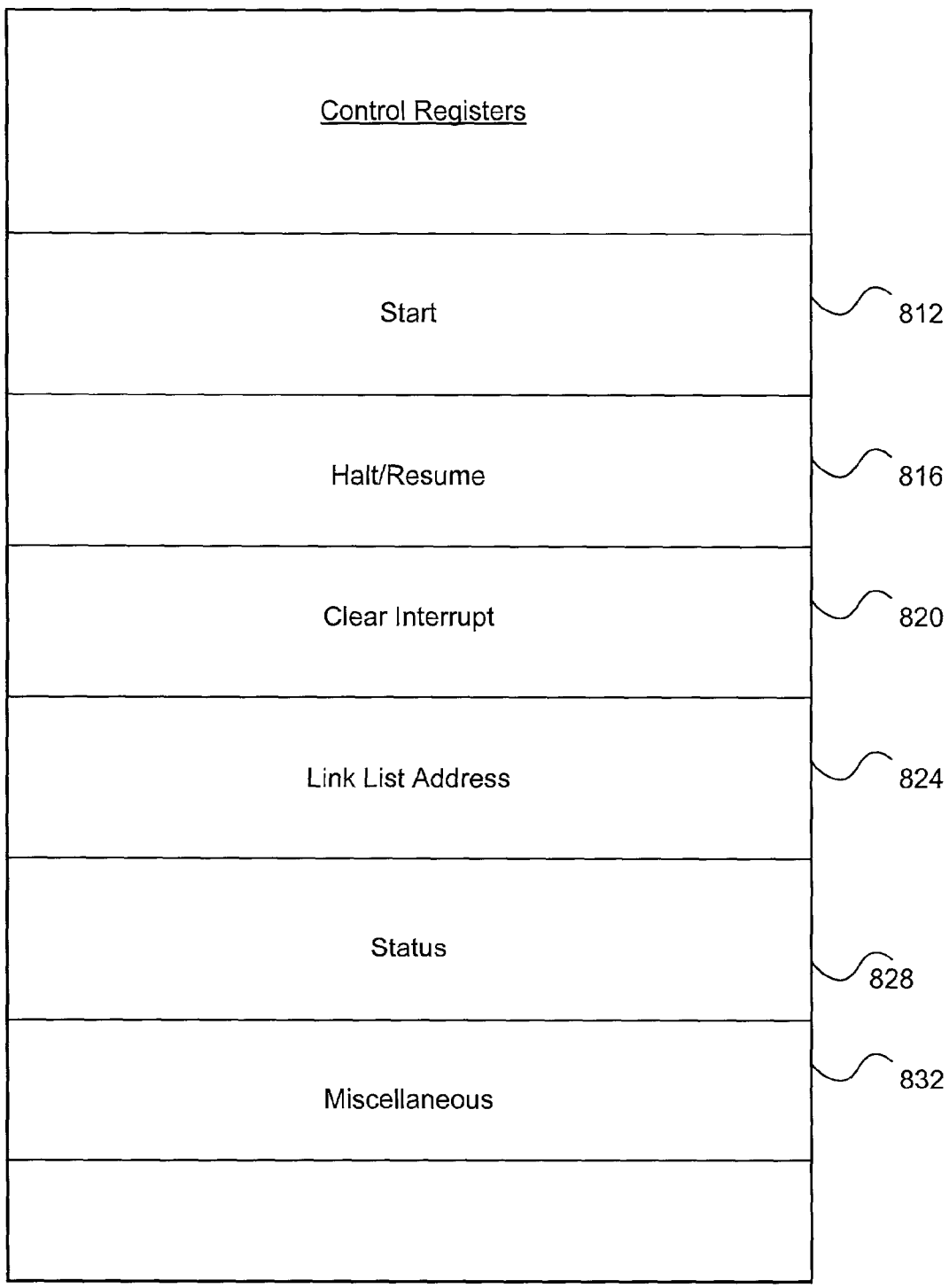
FIG. 8 is a block diagram for one embodiment of the control registers of FIG. 7, in accordance with the present invention.

Referring now to FIG. 8, a block diagram for one embodiment of the FIG. 7 control registers 716 is shown, in accordance with the present invention. In the FIG. 8 embodiment, control registers 716 may preferably include, but are not limited to, a start register 812, a halt/resume register 816, a clear interrupt register 820, a link list address register 824, a status register 828, and one or more miscellaneous registers 832.

In the FIG. 8 embodiment, CPU 114 or other appropriate entities may preferably set a start bit in start register 812 to initiate a data encryption operation. In one embodiment, start register 812 may preferably be implemented as a 1-byte register. CPU 114 or other appropriate entities may preferably set a halt bit in halt/resume register 816 to halt a particular data encryption operation. Similarly, CPU 114 or another entity may reset the foregoing halt bit in the halt/resume register 816 to resume the particular data encryption operation. In one embodiment, halt/resume register 816 may preferably be implemented as a 1-byte register.

In the FIG. 8 embodiment, CPU 114 or another entity may set a designated bit in clear interrupt register 820 to thereby clear a particular encryption/decryption interrupt event. In one embodiment, clear interrupt register 820 may preferably be implemented as a 1-byte register. CPU 114 or another appropriate entity may preferably program link list address register 824 to indicate the physical address in memory 126 of the first command structure 412 for a particular data encryption operation. In one embodiment, link list address register 824 may be implemented as a 4-byte register.

In the FIG. 8 embodiment, status register 828 may include various bits indicating one or more status conditions that correspond to a current data encryption operation. DMA engine 216 or another appropriate entity may preferably write to status register 828 to periodically update any stored status conditions. Status registers 828 may therefore be read by CPU 114 or any other interested entity to determine the foregoing one or more status conditions corresponding to a current data encryption operation. In one embodiment, status register 828 may preferably be implemented as a 1-byte register.

One or more miscellaneous registers 832 may include any appropriate or desired information to enable DMA engine 216 to effectively perform data encryption operations. In alternate embodiments, control registers 716 may readily include various other elements or functionalities in addition to, or instead of, those elements or functionalities discussed in conjunction with the FIG. 8 embodiment.

Figure 9:
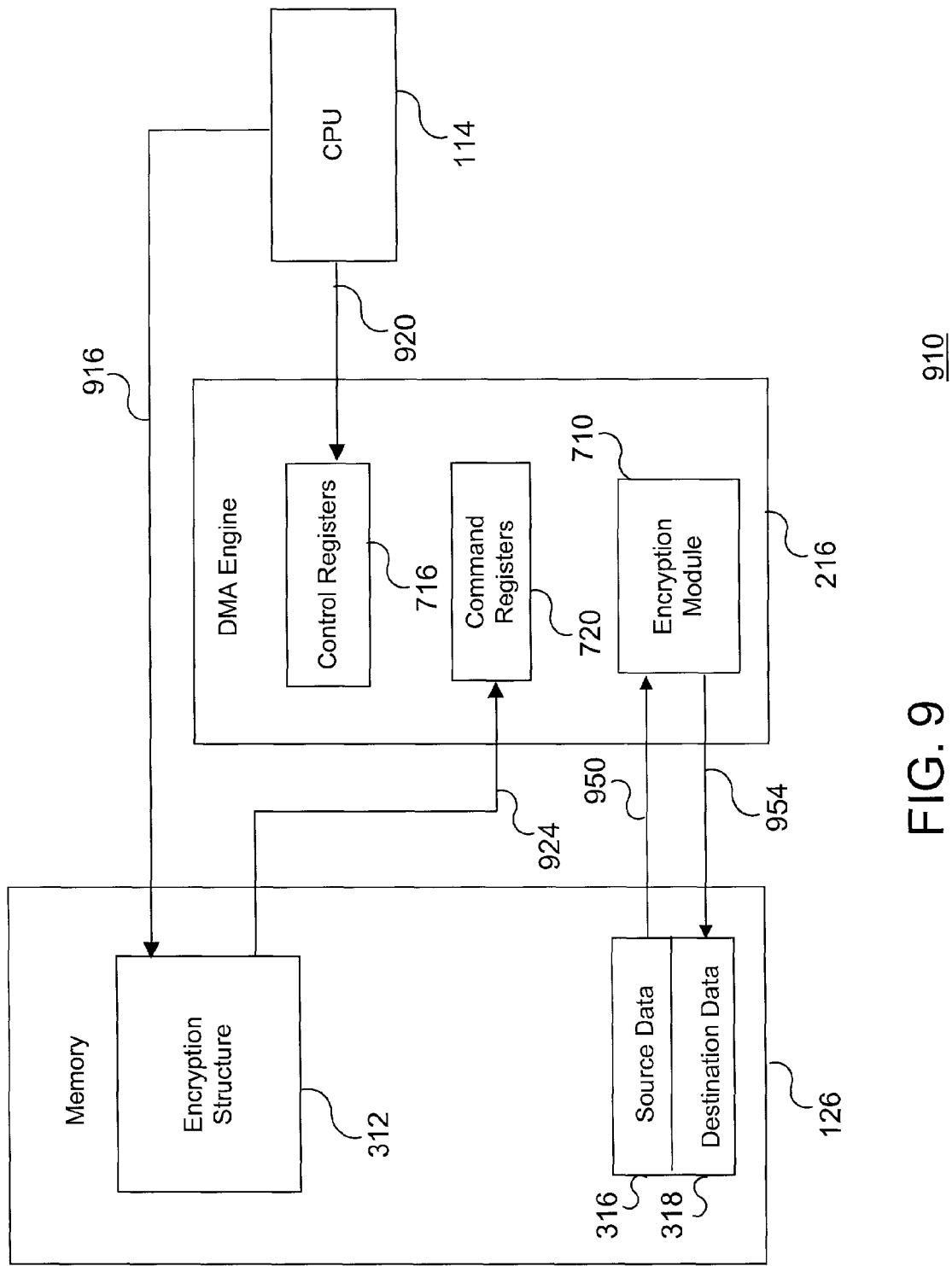
FIG. 9 is a block diagram illustrating a data encryption operation, in accordance with one embodiment of the present invention.

Referring now to FIG. 9, a block diagram illustrating a data encryption operation 910 is shown, in accordance with one embodiment of the present invention. As discussed elsewhere, the electronic system 110 may also readily perform a data decryption operation by utilizing principles that are the same or similar to those discussed in conjunction with the FIG. 9 embodiment.

In the FIG. 9 embodiment, data encryption operation 910 may preferably utilize, but is not limited to, a CPU 114, a DMA engine 216 having control registers 716, command registers 720, and encryption module 710, and a memory 126 having encryption structure 312, source data 316, and destination data 318. In alternate embodiments, data encryption operation 910 may readily function with various other elements or functionalities in addition to, or instead of, those elements or functionalities discussed in conjunction with the FIG. 9 embodiment.

In the FIG. 9 embodiment, initially, CPU 114 may preferably create one or more appropriate command structures 412 in encryption structure 312 of memory 126 via path 916. CPU 114 may subsequently determine that a particular data encryption operation is required in electronic system 110, and may responsively program control registers 716 in DMA engine 216 via path 920 to thereby initiate the required data encryption operation. CPU 114 may then advantageously relinquish control of the data encryption operation to DMA engine 216, and begin efficiently performing other processing tasks for electronic system 110.

In response, state machine 712 (not shown) of DMA engine 216 may preferably transfer one or more appropriate command structures 412 from encryption structure 312 in memory 126 into command registers 720 of DMA engine 216 via path 924. State machine 712 of DMA engine 216 may then locally access relevant information from control registers 716 and command registers 720 to thereby control a data encryption/decryption operation in accordance with the present invention.

In the FIG. 9 embodiment, state machine 712 may preferably provide designated source data 316 from memory 126 to data buffer 714 of encryption module 710 via path 950. As discussed above in conjunction with FIG. 7, encryption module 710 may responsively encrypt or decrypt the data in data buffer 714 using any effective techniques or methodologies. State machine 712 may then store the processed data as destination data 318 in memory 126. CPU 114 may then access and transfer the processed destination data 318 from memory 126 to any appropriate destination entity that is coupled to electronic system 110.

In accordance with the present invention, CPU 114 may thus advantageously store source data 316 into memory 126 from any source entity that is coupled to electronic system 110. CPU 114 may then initiate the foregoing data encryption or decryption operation, relinquish control to DMA engine 216, and proceed to efficiently perform other processing functions for electronic system 110. In addition, as shown above, a single flexible encryption/decryption mechanism may advantageously process source data 316 from any originating source entity that is coupled to electronic system 110, and then the processed destination data may be flexibly transferred to any desired final destination entity from memory 126.

Figure 10:
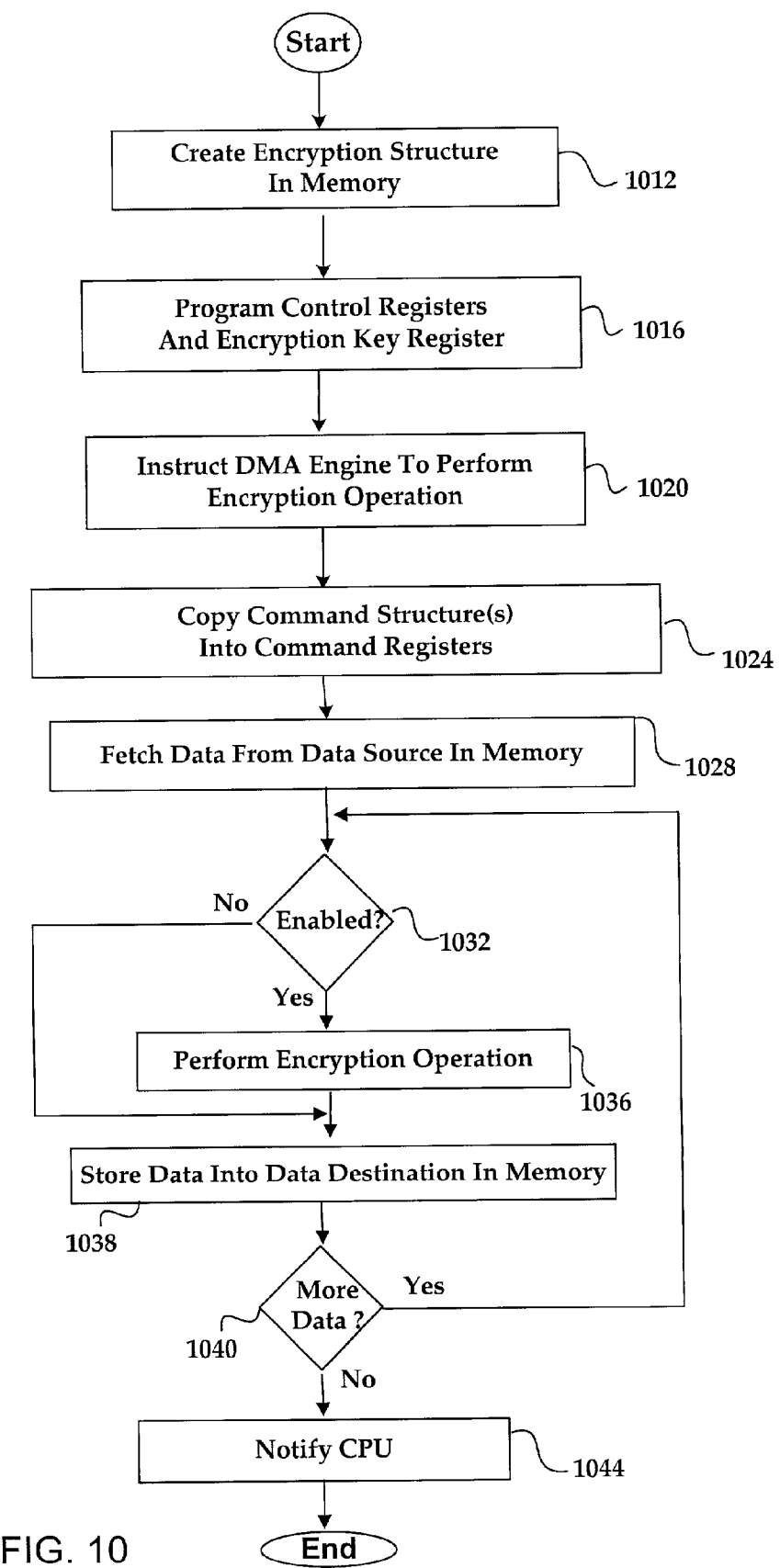
FIG. 10 is a flowchart of method steps for performing a data encryption operation, in accordance with one embodiment of the present invention.

Referring now to FIG. 10, a flowchart of method steps for performing a data encryption operation is shown, in accordance with one embodiment of the present invention. The FIG. 10 embodiment is presented for purposes of illustration, and in alternate embodiments, the present invention may readily utilize various steps and sequences other than those discussed in conjunction with the FIG. 10 embodiment. In addition, the FIG. 10 process may also be readily utilized to perform data decryption operation, in accordance with the present invention.

In the FIG. 10 embodiment, initially, in step 1012, CPU 114 may preferably create an encryption structure 312 that includes one or more command structures 412, and may store the resultant encryption structure 312 into memory 126. Then, in step 1016, CPU 114 may preferably monitor electronic system 110 until performance of a data encryption operation is required. When a data encryption operation is required in electronic system 110, then CPU 114 may preferably program control registers 716 of DMA engine 216 to provide relevant information regarding the required data encryption operation for local access by DMA engine 216. CPU 114 may also program encryption key register 724 with an encryption key, as discussed above in conjunction with FIG. 7.

Next, in step 1020, CPU 114 may preferably instruct DMA engine 216 to perform the required data encryption operation. In certain embodiments, CPU 114 may set a start bit in a start register 812 of control registers 716 to thereby instruct DMA engine 216 to perform the required data encryption operation. In response, in step 1024, state machine 712 of DMA engine 216 may preferably copy a designated command structure 412 from encryption structure 312 of memory 126 into command registers 720 of DMA engine 216. DMA engine 216 may then preferably reference the information in control registers 716 and command registers 720 to effectively control the required data encryption operation.

In step 1028, state machine 712 of DMA engine 214 may preferably fetch source data 316 from memory 126 at the location indicated in starting source address 512 of command structure 412. Next, in step 1032, state machine 712 may preferably check enabled/disabled field 614 of control status command 538 to determine whether the current data encryption operation is enabled. If the current data encryption operation is not enabled, then the FIG. 10 process may preferably advance to step 1038.

However, if the current data encryption operation is enabled, then in step 1036, encryption module 710 may preferably process the source data 316 by performing either a data encryption operation or a data decryption operation, depending upon the contents of encryption/decryption field 612 of control status command 538. In step 1038, state machine 712 may responsively store the original source data 316 as destination data 318 into memory 126.

In step 1040, DMA engine 214 may preferably determine whether more source data 316 remains to be encrypted or decrypted. If more source data 316 remains, then the FIG. 10 process may return to foregoing step 1032 to determine whether the current data encryption operation is enabled, and then may preferably continue the previously-described data encryption or decryption process. However, if DMA engine 216 determines that no source data 316 remains to be encrypted or decrypted, then in step 1044, DMA engine 216 may preferably notify CPU 114 regarding the completion of the encryption or decryption operation, and the FIG. 10 process may then terminate.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. An apparatus for performing a data encryption operation in an electronic system, comprising:
a processor coupled to said electronic system, said processor creating an encryption structure in a memory device, said processor also selectively programming control registers to perform said data encryption operation;
a DMA engine coupled to said processor, said DMA engine accessing said encryption structure and said control registers, said DMA engine including an encryption module that utilizes command information from said encryption structure and control information from said control to process source data to produce destination data during said data encryption operation.

2. The apparatus of claim 1 wherein said data encryption operation includes at least one of a data encryption process and a data decryption process.

3. The apparatus of claim 2 wherein said memory device receives said source data from a source entity coupled to said electronic system, said memory device responsively storing said source data into a source data memory location until said encryption module requires said source data to perform said data encryption operation.

4. The apparatus of claim 2 wherein said electronic system is implemented as one of an audio/visual electronic device, a consumer electronics device, a portable electronics device, and a computer device.

5. The apparatus of claim 2 wherein said electronic system includes a bridge device that facilitates bi-directional communications between said processor, one or more peripheral devices, said DMA engine, said encryption module, and said memory device.

6. The apparatus of claim 5 wherein said bridge device includes a processor interface for communicating with said processor, a memory interface for communicating with said memory device, and one or more peripheral interfaces for communicating with said one or more peripheral devices.

7. The apparatus of claim 2 wherein said encryption structure includes at least one command structure that has command information for performing said data encryption operation.

8. The apparatus of claim 7 wherein said command structure includes a starting source address, a starting destination address, a transfer-bytes total field, a next command-structure pointer, and a control status command.

9. The apparatus of claim 8 wherein said control status command includes an encryption/decryption field to indicate whether to perform one of said encryption process and said decryption process, an enabled/disabled field to indicate whether said data encryption operation is currently enabled, an interrupt field to designate whether an interrupt should occur following said data encryption operation, a last command field to indicate a final command structure in a linked list, and a transfer path identifier to indicate a source entity for said source data and a destination entity for destination data.

10. The apparatus of claim 2 wherein said encryption structure includes a series of command structures that are linked together in a linked list to thereby perform a series of data encryption operations.

11. The apparatus of claim 2 wherein said DMA engine includes a state machine for controlling said data encryption operation, one or more command registers for locally storing one or more command structures from said encryption structure, said control registers, a data buffer, an encryption key register, and said encryption module.

12. The apparatus of claim 2 wherein said control registers include a start register that said processor may program to start said data encryption operation, a halt/resume register that said processor may program to halt or resume said data encryption operation, a clear interrupt register that said processor may program to clear an interrupt of said data encryption operation, a link list address register that said processor may program with a physical address in said memory device of a first command structure in said encryption structure, and a status register that said DMA engine may program to indicate a current status of said data encryption operation.

13. The apparatus of claim 2 wherein said processor initially creates said encryption structure in said memory device, said encryption structure including one or more command structures that each include command information for performing a separate data encryption operation.

14. The apparatus of claim 13 wherein said processor programs said control registers with data encryption information that is then locally available to said DMA engine for performing said data encryption operation.

15. The apparatus of claim 14 wherein said processor instructs said DMA engine to perform said data encryption operation after programming said control registers, said processor then releasing control of said data encryption operation and performing other system processing tasks for said electronic system.

16. The apparatus of claim 15 wherein said DMA engine copies one or more designated command structures from said encryption structure in said memory device into one or more command registers that are locally coupled to said DMA engine.

17. The apparatus of claim 16 wherein said DMA engine controls said data encryption operation by referring to said control registers and said command registers.

18. The apparatus of claim 17 wherein a state machine coupled to said DMA engine transfers said source data from said memory device to a data buffer coupled to said encryption module, said encryption module responsively performing at least one of said data encryption process and said data decryption process to produce said destination data, said state machine then storing said destination data back into said memory device.

19. The apparatus of claim 18 wherein said DMA engine detects a completion condition while performing said data encryption operation, said DMA engine responsively notifying said processor regarding said completion condition.

20. The apparatus of claim 19 wherein said processor transfers said destination data from said memory device to a destination entity that is coupled to said electronic system.

21. A method for performing a data encryption operation in an electronic system, comprising:
   creating an encryption structure in a memory device by utilizing a processor;
   programming control registers by said processor to perform said data encryption operation;
   accessing said encryption structure and said control registers with a DMA engine; and
   processing source data with an encryption module of said DMA engine to produce destination data, said encryption module utilizing command information from said encryption structure and control information from said control registers to perform said data encryption operation.

22. The method of claim 21 wherein said data encryption operation includes at least one of a data encryption process and a data decryption process.

23. The method of claim 22 wherein said memory device receives said source data from a source entity coupled to said electronic system, said memory device responsively storing said source data into a source data memory location until said encryption module requires said source data to perform said data encryption operation.

24. The method of claim 22 wherein said electronic system is implemented as one of an audio/visual electronic device, a consumer electronics device, a portable electronics device, and a computer device.

25. The method of claim 22 wherein said electronic system includes a bridge device that facilitates bi-directional communications between said processor, one or more peripheral devices, said DMA engine, said encryption module, and said memory device.

26. The method of claim 25 wherein said bridge device includes a processor interface for communicating with said processor, a memory interface for communicating with said memory device, and one or more peripheral interfaces for communicating with said one or more peripheral devices.

27. The method of claim 22 wherein said encryption structure includes at least one command structure that has command information for performing said data encryption operation.

28. The method of claim 27 wherein said command structure includes a starting source address, a starting destination address, a transfer-bytes total field, a next command-structure pointer, and a control status command.

29. The method of claim 28 wherein said control status command includes an encryption/decryption field to indicate whether to perform one of said encryption process and said decryption process, an enabled/disabled field to indicate whether said data encryption operation is currently enabled, an interrupt field to designate whether an interrupt should occur following said data encryption operation, a last command field to indicate a final command structure in a linked list, and a transfer path identifier to indicate a source entity for said source data and a destination entity for destination data.

30. The method of claim 22 wherein said encryption structure includes a series of command structures that are linked together in a linked list to thereby perform a series of data encryption operations.

31. The method of claim 22 wherein said DMA engine includes a state machine for controlling said data encryption operation, one or more command registers for locally storing one or more command structures from said encryption structure, said control registers, a data buffer, an encryption key register, and said encryption module.

32. The method of claim 22 wherein said control registers include a start register that said processor may program to start said data encryption operation, a halt/resume register that said processor may program to halt or resume said data encryption operation, a clear interrupt register that said processor may program to clear an interrupt of said data encryption operation, a link list address register that said processor may program with a physical address in said memory device of a first command structure in said encryption structure, and a status register that said DMA engine may program to indicate a current status of said data encryption operation.

33. The method of claim 22 wherein said processor initially creates said encryption structure in said memory device, said encryption structure including one or more command structures that each include command information for performing a separate data encryption operation.

34. The method of claim 33 wherein said processor programs said control registers with data encryption information that is then locally available to said DMA engine for performing said data encryption operation.

35. The method of claim 34 wherein said processor instructs said DMA engine to perform said data encryption operation after programming said control registers, said processor then releasing control of said data encryption operation and performing other system processing tasks for said electronic system.

36. The method of claim 35 wherein said DMA engine copies one or more designated command structures from said encryption structure in said memory device into one or more command registers that are locally coupled to said DMA engine.

37. The method of claim 36 wherein said DMA engine controls said data encryption operation by referring to said control registers and said command registers.

38. The method of claim 37 wherein a state machine coupled to said DMA engine transfers said source data from said memory device to a data buffer coupled to said encryption module, said encryption module responsively performing at least one of said data encryption process and said data decryption process to produce said destination data, said state machine then storing said destination data back into said memory device.

39. The method of claim 38 wherein said DMA engine detects a completion condition while performing said data encryption operation, said DMA engine responsively notifying said processor regarding said completion condition.

40. The method of claim 39 wherein said processor transfers said destination data from said memory device to a destination entity that is coupled to said electronic system.

41. An apparatus for performing a data encryption operation in an electronic system, comprising:

means for creating an encryption structure in a memory device;

means for programming control registers to thereby facilitate efficiently performing said data encryption operation;

means for accessing said encryption structure and said control registers to thereby control said data encryption operation; and means for processing source data to produce destination data during said data encryption operation.

42. An apparatus for performing a data processing operation in an electronic system, comprising:

a processor coupled to said electronic system for creating a data structure in a memory device, said processor also selectively programming control registers to thereby facilitate efficiently performing said data processing operation;

an engine coupled to said processor for accessing said data structure and said control registers to thereby control said data processing operation; and a processing module coupled to said engine for processing source data to produce destination data during said data processing operation.

* * * * *